2,782,110
METAL-CERAMIC BONDED GRANULAR MATERIAL

John Cantrell, Edwin Percy Degg, and Frederick Laurence Nobes, Manchester, England, assignors, by mesne assignments, to The Carborundum Company, Niagara Falls, N. Y., a corporation of Delaware No Drawing. Application November 20, 1952,
Serial No. 321,714
Claims priority, application Great Britain
November 20, 1951

7 Claims. (Cl. 51—308)

This invention relates to articles of manufacture comprising a granular or particulate material bonded by a composite bond composed of both ceramic and metallic constituents. It also relates to methods of making such articles.

While the invention is especially applicable to the manufacture of bonded abrasive articles, it is also adapted to the making of manifold other articles of manufacture such as articles which must be resistant to abrasion, heat-resistant or refractory in character and also to the making of electrical conductors and resistance bodies. Therefore, although the invention will be primarily described as it pertains to the making of various types of bonded abrasive articles, it is not desired to be limited thereto.

It is an object of the present invention to provide novel abrasive articles or other articles of manufacture in which the abrasive particles or other granular material constituting one component of the article are held together by a bond containing both vitreous or glass-forming constituents and metallic constituents.

Various additional objects and advantages accruing from the practice of the present invention will become apparent as the description proceeds.

According to the present invention, articles of manufacture such as bonded abrasive articles are made in which the abrasive granules or other particulate material of the article are held together in a fused or sintered metal-ceramic bonding matrix comprising a composition of vitreous, glass-forming or oxidic ceramic materials and one or more metals and/or alloys. The abrasive grain or other granular component of the article can be present in any amount ranging from 5–95% by weight of the finished body or article.

The nature and amount of the granular component of the resulting article or body will depend upon the specific type of article being made. For example, bonded abrasive articles can be made in accordance with the present invention in which the granular abrasive is aluminum oxide, silicon carbide, diamond, or mixtures thereof, the particular particle size and amount of granular material depending upon the particular form and character of abrasive article being fabricated. Other articles of manufacture can be similarly made in which granular constituents which have certain desired electrical properties, refractory properties or the like are selected.

The ceramic constituent of the bond is usually a glassy or vitreous material such as, for example, a borosilicate glass or a lead bisilicate glass, or the like. However, the ceramic constituent may be a mixture of ceramic oxidic materials so proportioned as to provide when sintered or fused a vitreous or glass-forming material of the desired composition.

Among the metal constituents of the bond which have been found satisfactory are copper, mixtures of copper and tin such as a bronze alloy composed of 80% copper and 20% tin, aluminum, iron or other suitable metals or alloys.

We have found from examination and determination of the properties and characteristics of the finished bodies made according to the present invention that in many respects particularly satisfactory results are obtained when the metallic components and the ceramic components of the bonding matrix of the article are so chosen and proportioned with respect to one another that the resulting bonding matrix is one in which both the metallic phase and the ceramic phase are more or less continuous throughout the body of the article.

Various procedures may be followed in making metal-ceramic bonded articles according to the present invention. The bonding mixture of metallic and vitreous or ceramic ingredients is usually ball-milled to an appropriate fineness, for example, so as to pass through a 200 mesh sieve, after which the granular material such as the abrasive grains, is mixed with the previously ground bonding mixture. The resulting article is then formed to the desired shape by means of a hot or cold molding or extruding operation. For example, one method of forming a metal-ceramic bonded article consists of first subjecting the desired mixture of materials to pressure without the application of heat, and subsequently heating the molded shape to the desired temperature without the application of pressure. However, the more desirable practice has been found to be to subject the mixture of granular material and powdered metal and ceramic or vitreous bonding materials simultaneously to a temperature and pressure sufficient to fuse or sinter the metal and vitrify the ceramic materials with or without a preliminary pressure-molding operation at room temperature. When the articles are hot pressed in a mold the mold should be of a heat-resisting material such as hot die steel, austenitic steel or a chrome-nickel alloy manufactured and sold under the trademark "Nimonic," or of carbon, or of other suitable refractory material, depending upon the particular temperatures and pressures employed in the molding operation.

According to still another modified form of practicing the present invention which has been found to be highly satisfactory for obtaining articles of extremely high strength and density the mixture of granular material and bond of which the article is to be composed are preliminarily molded into simple briquette form and fired at a suitable temperature and pressure, after which the molded and fired briquetted material is subjected to a crushing operation and the resulting crushed material used, with or without the addition of further metallic and ceramic bonding materials, to make the final desired molded article by any one of the procedures set forth hereinabove.

Articles have been satisfactorily molded or formed by the above-described methods utilizing copper, mixtures of copper and tin in bronze-forming proportions, aluminum, or iron as the metallic constituent in conjunction with borosilicate and lead bisilicate powdered glass frits wherein the final compacting of the article under pressure has been accomplished at a pressure of 4,000 pounds per square inch at a temperature of 600–650° C.

The following are specific examples of methods for making abrasive articles and other products in accordance with the teachings of the present invention.

Example I

Metal-ceramic bonded alumina polishing and ball wheels have been made as follows:

| | Percentage by weight |
|---|---|
| Finely divided fused alumina grain | 55 |
| Metal-ceramic bond mixture | 45 |

The metal-ceramic bonding mixture consisted of 60 parts by weight of a borosilicate glass and 40 parts by weight of a copper-tin alloy of bronze-forming proportions composed of 80% by weight of copper and 20% by weight of tin. The above constitutents, except for the fused alumina, were ball milled in a ball mill for 18 hours after which the fused alumina grain was added and intimately mixed with the other ingredients in a ball mill with a reduced charge of balls for about 3 hours. The size of the granular fused alumina was varied depending upon the specific polishing purpose for which the finished article was to be employed but was usually between 100 and 400 mesh particle size. The resulting ball milled mixture was cold pressed in a mold of hot die steel at 4,000 pounds per square inch and then while still in the mold heated in an electric furnace for a sufficient length of time and hot pressed at 600° C. and 4,000 pounds per square inch pressure while in the heating furnace. For example, high density ball wheels 5" in diameter, 1" in thickness and having a 2" arbor were held at maximum temperature and pressure for ten minutes. 24" diameter wheels of similar character have also been successfully made. After the hot-pressing operation the molds were immediately removed from the articles before any substantial drop in temperature occurred. The resulting abrasive articles were allowed to cool in air after extraction from the molds with satisfactory results although superior results were obtained when the articles were annealed by allowing them to cool slowly while remaining in the furnace.

Ball grinding wheels which were molded by hot-pressing an abrasive-bonding composition of the above-described type were found to give excellent performance results in that the resulting ball wheels ground several times as many balls as those ground by comparable wheels of the same grit size which had been made by cold pressing and firing procedure.

Example II

Satisfactory wear-resistant bodies have been made from a mixture of 80% by weight cast iron powder, 10% by weight powdered borosilicate glass and 10% by weight fused alumina grain of 200 mesh particle size, the mixture being ball milled for 18 hours and then hot pressed at a temperature of 650° C. and a pressure of 16 tons per square inch. The resulting wear-resistant bodies had a modulus of rupture under transverse load of 43,000 pounds per square inch.

Example III

Light-weight, wear-resistant bodies have been made in which the ceramic constituent of the bond was a glass formed from a mixture of 65% by weight lead oxide and 35% silica. The glass constituted 30% by weight of the raw batch mixture together with 20% by weight of aluminum powder and 50% by weight of fused alumina grain of 200 mesh particle size. The raw batch mixture was ball milled for 18 hours and screened, on removal from the ball mill, through a 200 mesh screen. The resulting mixture was then hot-pressed at a temperature of 550° C. and a pressure of 4,000 pounds per square inch to produce light-weight, wear-resistant bodies of the desired shape.

Example IV

According to a further modification of the present invention, abrasive bodies of high density and mechanical strength were made from mixtures of 20% by weight of a copper-tin bronze-forming metal powder mixture consisting of 80% by weight copper and 20% by weight tin, 30% by weight of borosilicate glass, and 50% by weight of fused alumina of 200 mesh particle size. The raw batch mixture was first molded into briquette form by hot pressing at a temperature of 600° C. and 5 tons per square inch pressure, after which the fired briquetted material was crushed and remolded to the final desired shape under the same conditions of temperature and pressure to produce abrasive bodies having high density and with mechanical strengths approximately 50% greater than strengths obtained in bodies of similar composition hot pressed directly from the raw materials without an initial briquetting operation.

Example V

According to another modification, metal-ceramic bonded abrasive bodies have been molded from a mixture of 30% by weight borosilicate glass, 20% by weight copper-tin metal mixture consisting of 80% by weight copper and 20% by weight tin, and 50% by weight fused alumina grain of 200 mesh particle size. Articles of the desired shape were obtained by hot pressing at a temperature of 650° C. and a pressure of 5 tons per square inch after which the molded articles were allowed to cool slowly to 500° C., held at that temperature for two hours, and then slowly cooled to room temperature in order to effect annealing of the body. This particular technique has been found especially satisfactory in the molding of objects of substantial thickness where it is desired to minimize the danger of cracking.

TABLE I

| Metal Component, Percent by wt. | Ceramic Component, Percent by wt. | Modulus of Rupture, #/sq. inch | Yield | Sandblast Penetration | Electrical Resistance |
|---|---|---|---|---|---|
| 0 | 100 |  |  | 46 | Greater than 100 megohms per cm.³ |
| 10 | 90 | 708 | Nil | 36 | |
| 20 | 80 | 6,820 | 0.9 | 30 | |
| 40 | 60 | 13,200 | 1.6 | 18 | |
|  |  |  |  |  | Microhms per cm.³ |
| 60 | 40 | 15,030 | 2.0 | 10 | 4,890 |
| 80 | 20 | 25,830 | 3.6 | 5.5 | 525 |
| 90 | 10 | 30,200 | 3.9 | 4 | 444 |
| 100 | 0 | 33,780 | 5.4 | 2.5 | 390 |

Table I above shows the properties of metal-ceramic bond compositions containing various proportions of metal and ceramic constituents. The metal component in the bonding compositions of Table I was a bronze composition consisting of 80% by weight copper and 20% by weight tin. The ceramic component of the bond was a boro-silicate glass frit in powdered form. When the data presented in Table I are depicted in graph form several significant features are brought out. For example, it is noted that the electrical resistance changes markedly when the amount of metal exceeds 40% by weight of the bond composition, indicating that the metal phase of the bonding composition is substantially continuous when the amount of metal in the bond exceeds that amount. It is further noted in plotting the moduli of rupture for the various bond compositions of Table I that there is a significant break in the values between the bond compositions containing 40% metal and 60% ceramic material and those containing 60% metal and 40% ceramic material. It is believed that in this particular range of compositions from 40–60% metal and 60–40% ceramic material both components to some extent exist in a continuous phase.

TABLE II

| Metal Component, Percent by wt. | Ceramic Component, Percent by wt. | Modulus of Rupture, #/sq. inch | Yield | Sandblast Penetration | Conductive or Non-conductive |
|---|---|---|---|---|---|
| 10 | 90 | 8,870 | 0.9 | 22 | NC |
| 20 | 80 | 8,143 | 1.9 | 13 | NC |
| 35 | 65 | 16,455 | 3.4 | 4½ |  |
| 40 | 60 | 16,520 | 3.1 | 7 | JO |
| 45 | 55 | 17,450 | 2.6 | 7½ |  |
| 60 | 40 | 10,050 | 3.2 | 4 | C |
| 80 | 20 | 11,140 | 7.8 | 15 | C |
| 90 | 10 | 10,120 | 31 |  | C |
| 100 | 0 | 11,800 | over scale | 15 | C |

Table II above presents the properties of a series of metal-ceramic bond compositions in which the ceramic constituent of the bond is again a borosilicate glass frit whereas the metal constituent of the bond is an aluminum powder. It is to be noticed that the range of bond compositions containing from 35–45% aluminum and from 65–55% borosilicate glass have much higher moduli of rupture, indicating that the metal-ceramic compositions are strongest when the metal and ceramic components of the bond are so proportioned as to provide a bond composition in which there is a double continuous phase, in other words, in which both the metal and the ceramic constituents are in continuous phase.

TABLE III

| Metal Component, Percent by wt. | Ceramic Component, Percent by wt. | Modulus of Rupture, #/sq. inch | Yield | Sand-blast Penetration | Conductive or Non-conductive |
|---|---|---|---|---|---|
| 10 | 90 | 12,150 | 1.55 | 17 | NO |
| 20 | 80 | 16,250 | 2.3 | 12 | NO |
| 40 | 60 | 26,000 | 3.88 | 7 | C |
| 60 | 40 | 15,030 | 2.8 | 14½ | C |

The effect of prealloying the metal and ceramic constituents is readily shown in Table III above in which the metal and ceramic constituents were the same as those for Table II but in which the bonding constituents were first hot pressed in briquette form and subsequently crushed and the resulting crushed material used in a second molding and firing operation to form the shaped bodies upon which the various physical property tests were conducted. It is apparent from the column showing the modulus of rupture that the mechanical strength has been increased around 50% by the prealloying step.

We have found that the properties of the metal-ceramic bonded articles herein-described can be advantageously modified by varying the ratio of metal to ceramic constituents employed in addition to those variations which can be obtained by the change in the specific metal and/or ceramic ingredient. In a metal-ceramic series having an initial continuous network of either constituent in the finished product, an increase of the other constituent results in a steady change in the properties up to the range where co-existing continuous phases or networks of both constituents occur. Within this range of double continuous phase we have discovered in many cases that the properties attain optimum and even unexpected values which result in improved and useful products when the resulting bonding compositions are used as the bonding component of those articles.

Having described the invention in detail, it is desired to claim:

1. An article of manufacture comprising 5% to 95% by weight of a non-metallic inorganic granular material held together in 95% to 5% by weight of a bonding matrix, said bonding matrix comprising a vitreous ceramic material selected from the group consisting of borosilicate glass and lead bisilicate glass and a metallic material selected from the group consisting of copper, copper-tin alloy, aluminum and iron, said vitreous ceramic material and metallic material being so proportioned that both the ceramic material and the metal are in substantially continuous phase.

2. An article of manufacture comprising 5% to 95% by weight of a non-metallic inorganic granular material held together in 95% to 5% by weight of a bonding matrix, said bonding matrix comprising 40% to 60% by weight of borosilicate glass and 60% to 40% by weight of copper-tin alloy.

3. An article of manufacture comprising 5% to 95% by weight of an non-metallic inorganic granular material held together in 95% to 5% by weight of a bonding matrix, said bonding matrix comprising 40% to 60% by weight of borosilicate glass and 60% to 40% by weight of copper-tin alloy consisting essentially of 80% by weight copper and 20% by weight tin.

4. An article of manufacture comprising 5% to 95% by weight of a non-metallic inorganic granular material held together in 95% to 5% by weight of a bonding matrix, said bonding matrix comprising 55% to 65% by weight of borosilicate glass and 45% to 35% by weight aluminum.

5. A method of making metal-ceramic bonded articles which comprises forming a mixture of 5% to 95% by weight of non-metallic inorganic granular material and 95% to 5% by weight of a bonding matrix material consisting essentially of a vitreous ceramic material selected from the group consisting of borosilicate glass and lead bisilicate glass and a metallic material selected from the group consisting of copper, copper-tin alloy, aluminum and iron, said vitreous ceramic material and metallic material being so proportioned that both the ceramic material and the metal will be in substantially continuous phase in the resulting fired article, molding an article therefrom, and firing the molded article at a temperature of 550° C. to 650° C. to mature the bonding matrix materials in which both the ceramic material and the metal of the bonding matrix are in continuous phase.

6. A method of making metal-ceramic bonded articles which comprises forming a mixture of 5% to 95% by weight of non-metallic inorganic granular material and 95% to 5% by weight of a bonding matrix material consisting essentially of a vitreous ceramic material selected from the group consisting of borosilicate glass and lead bisilicate glass and a metallic material selected from the group consisting of copper, copper-tin alloy, aluminum and iron, said vitreous ceramic material and metallic material being so proportioned that both the ceramic material and the metal will be in substantially continuous phase in the resulting fired article, placing said mixture in a mold, and subjecting the mold contents to a pressure of 4000 pounds per square inch and a temperature of 550° C. to 650° C. to mature the bond and form a bonding matrix in which the ceramic material and the metal of the bonding matrix are in continuous phase.

7. A method of making metal-ceramic bonded articles which comprises forming a mixture of 5% to 95% by weight of non-metallic inorganic granular material and 95% to 5% by weight of a bonding matrix material consisting essentially of a vitreous ceramic material selected from the group consisting of borosilicate glass and lead bisilicate glass and a metallic material selected from the group consisting of copper, copper-tin alloy, aluminum and iron, said vitreous ceramic material and metallic material being so proportioned that both the ceramic material and the metal will be in substantially continuous phase in the resulting fired article, forming said material into a compacted mass, heating said compacted mass to a temperature sufficient to sinter the same into a hard body, crushing said mass to the desired grit size, and molding the crushed material to form the desired shape, and firing said shape at a temperature of 550° C. to 650° C. to re-sinter the particles and form a strong body in which the ceramic material and the metallic material of the bonding matrix are in continuous phase.

References Cited in the file of this patent

UNITED STATES PATENTS

| | | |
|---|---|---|
| 951,113 | Grossmann | Mar. 8, 1910 |
| 2,132,005 | Milligan et al. | Oct. 4, 1938 |
| 2,137,329 | Boyer | Nov. 22, 1938 |
| 2,319,331 | Kurtz | May 18, 1943 |
| 2,332,241 | Lombard et al. | Oct. 19, 1943 |
| 2,352,246 | Benner et al. | June 27, 1944 |